US007020931B1

(12) United States Patent
Burnett et al.

(10) Patent No.: US 7,020,931 B1
(45) Date of Patent: Apr. 4, 2006

(54) GROMMET AND RETAINER

(75) Inventors: Jason T. Burnett, Toledo, OH (US); Noriyuki Nagamine, Novi, MI (US); Jake Takahashi, Novi, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 10/744,286

(22) Filed: Dec. 23, 2003

(51) Int. Cl.
*F16L 5/02* (2006.01)

(52) U.S. Cl. .............................. 16/2.2; 16/2.3; 16/2.1; 174/65 G; 174/152 G; 174/153 G

(58) Field of Classification Search .................. 16/2.2, 16/2.3, 2.1, 2.4; 174/65 G, 152 G, 153 G, 174/17 CT, 151
See application file for complete search history.

(56) References Cited

U.S. PATENT DOCUMENTS 4,656,689 A * 4/1987 Dennis ......................... 16/2.2
4,928,349 A * 5/1990 Oikawa et al. ......... 174/153 G
4,966,374 A 10/1990 Oikawa et al.
5,123,862 A * 6/1992 Suzuki ....................... 439/533
5,337,447 A 8/1994 Tanaka et al.
5,339,491 A 8/1994 Sims
5,588,260 A * 12/1996 Suzuki et al. ................. 49/502

FOREIGN PATENT DOCUMENTS

JP 9289726 11/1997

* cited by examiner

*Primary Examiner*—Brian E. Glessner
*Assistant Examiner*—Mark Williams
(74) *Attorney, Agent, or Firm*—Young & Basile, P.C.

(57) ABSTRACT

A grommet assembly for use in providing a weatherproof conduit for electrical and/or pneumatic lines between, for example, an automotive body structure and the interior of a door hingedly mounted on the vehicle body structure. The grommet is made of a soft material and is provided with opposed open ends, each of which receives a retainer made of a harder plastic material. At least one end of the grommet is provided with a retainer groove and opposed pairs of receptacles which create raised details on the outside surface of the grommet end structure. The retainer is provided with arrowhead-shaped protrusions which, when the retainer is properly disposed within the end structure of the grommet body, fit into and enlarge the receptacles to provide both visual and tactile indications that the grommet retainer is properly installed.

9 Claims, 3 Drawing Sheets

GROMMET AND RETAINER

FIELD OF THE INVENTION

This invention relates to grommets of the type used to provide a weatherproof and sound deadening conduit for service lines extending between relatively movable automotive body portions and more particularly to a grommet/retainer combination in which a positive indication of the proper installation of the retainer within the grommet is provided.

BACKGROUND OF THE INVENTION

Pliable grommets are used to provide weatherproof conduits for electrical and/or pneumatic lines extending between, for example, an automobile body structure and a hinged door attached to the body structure.

The typical grommet is a tubular body made of soft pliable material such as EPDM rubber and having integral enlarged end portions. Hard plastic retainers are placed into the enlarged end portions to provide a snap-in installation and retention function relative to a pre-formed aperture in the panel through which the service line protected by the grommet extends. The retainer is usually frame-shaped and has barbs to engage the edge of the aperture and hold the grommet against the body panel to provide a seal.

A problem associated with a structure of the type described above arises out of the fact that there is no easy way to confirm the fact that the retainer is correctly installed into the grommet end portion. This can give rise to construction delays and/or faulty installations.

Visual installation confirmation can be provided by forming a number of holes in the grommet wall structure and to provide projecting elements on the outer edge of the retainer in locations which are matched with the holes so that the projections extend through the holes when the retainer is properly installed. While this approach provides retainer installation verification, the presence of the holes in the grommet tends to compromise the weatherproof quality of the grommet in that they increase the possibility of moisture intrusion.

SUMMARY OF THE INVENTION

The present invention provides a further improvement to grommet/retainer combinations of the type generally described above wherein, instead of holes in the wall structure of the grommet, expandable receptacles are integrally molded into the grommet wall structure, preferably but not necessarily contiguous with a retainer edge receiving groove. These receptacles appear as protrusions or bumps on the outside surface of the grommet wall structure. The retainer is provided with mating protrusions, also referred to herein as "arrowheads," which, when the retainer is properly installed, extend into the receptacles and expand the receptacles into a raised condition. Thus, the proper installation of the grommet retainer, in the preferred embodiment, provides not only a visual indication that the grommet retainer has been properly installed, but further provides tactile confirmation that the harder arrowhead material is disposed or located on the inside of the grommet receptacles.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF THE ILLUSTRATIVE EMBODIMENT

Figure 1:
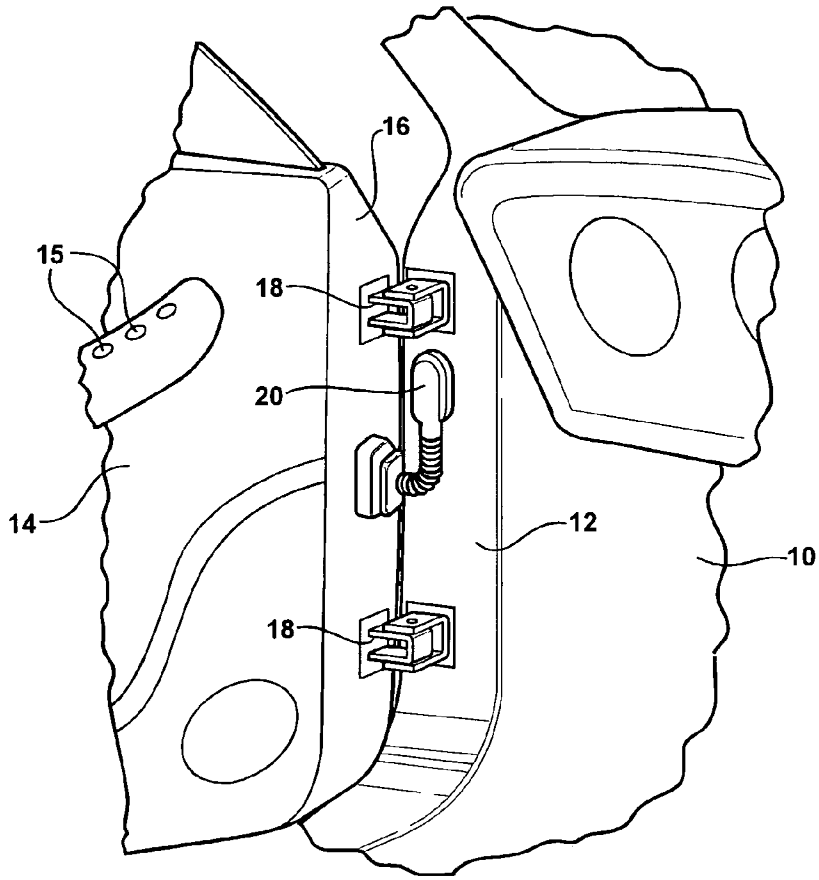
FIG. 1 is a perspective view of the invention in the environment of a typical installation between an automotive body panel and a door edge panel.

Referring to FIG. 1, there is shown a portion of an automotive vehicle body structure 10 having a fixed door edge opening 12 configured to receive and mate with a door 14 having a forward interior edge panel 16 and mounted by way of hinges 18 to the vehicle body structure 10. The door 14 is equipped with power window and power lock controls 15 which require either or both of electrical and pneumatic service lines to be run between the body structure 10 and the door 14. To provide such in a moisture-proof fashion, a grommet assembly 20 is provided, said grommet assembly having portions which are sealingly mounted around openings or apertures in panels 12 and 16 in a manner to be described.

Figure 3:
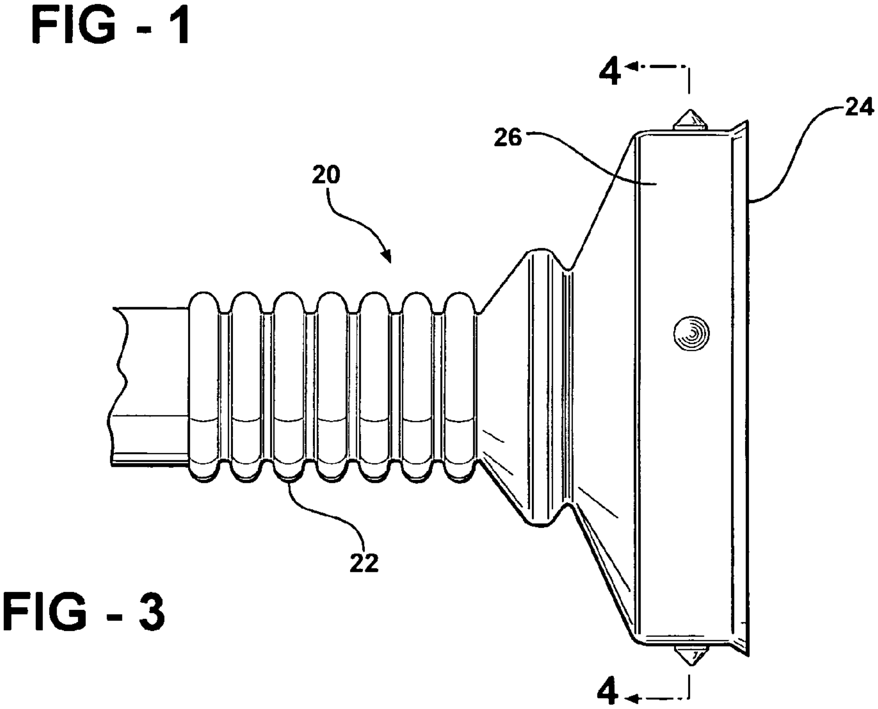
FIG. 3 is a side view of one end of the grommet incorporating the present invention.
Figure 2:
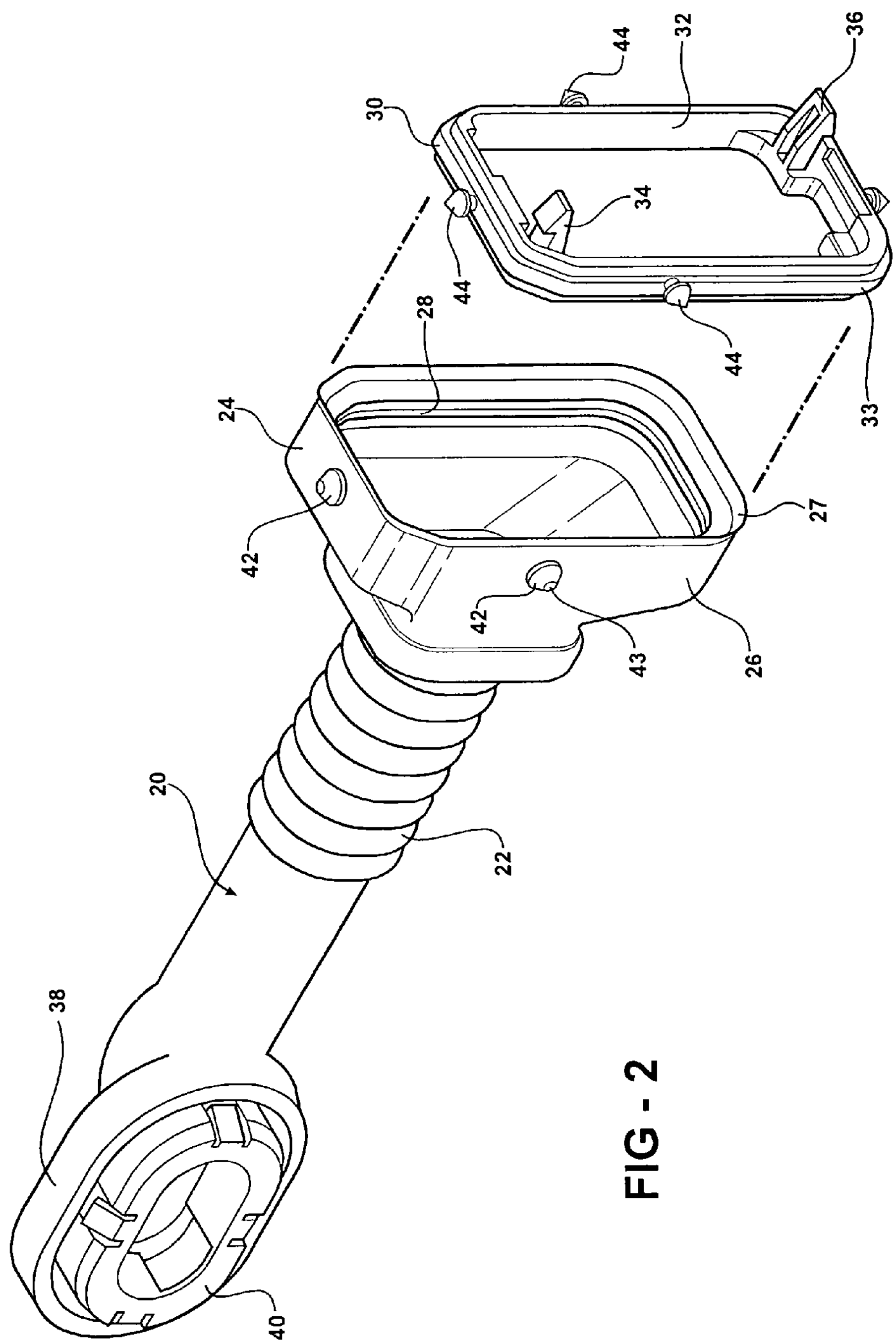
FIG. 2 is a perspective view of a grommet incorporating the invention and showing the retainer exploded outwardly from the end portion of the grommet in which it is located.

Referring now to FIGS. 2–5, the grommet assembly 20 includes a grommet body made of EPDM rubber; i.e., a relatively soft and pliable material which includes in this instance a tubular portion 22 having a molded-in goose-neck pattern shown in FIG. 3 and a first enlarged end 24 having a peripheral wall structure 26 which, by way of example only, is essentially rectangular in shape and which defines a peripheral edge seal 27 adapted to sealingly contact and abut the panel 16 of the door. The wall structure 26 is molded so as to define a continuous internal peripheral groove 28 which opens to the interior of the end structure 24 and a plurality of receptacles 42 which are arranged in opposite pairs and which open to the interior of the peripheral groove 28. The receptacles 42 are integral with the EPDM rubber grommet assembly 20 and are normally relatively flat and soft to the touch when empty. To explain, the receptacles 42 assume a relatively low profile with flat top surfaces 43 when empty as shown in FIG. 2 and as also shown by the broken lines in FIG. 5. The receptacles 42 on the long side of the rectangular wall structure 26 are preferably closer to one end than the other to ensure that a retainer goes in only one way.

The assembly further comprises a frame-like retainer 30 made of a harder material such as injection moldable polyethylene of such size and shape as to fit within and conform to the interior of the open-ended wall structure 26 to provide the function of snap-locking the grommet assembly 20 to a prepared opening in the door edge panel 16. The retainer 30 has a rectangular frame-like body 32 including an edge flange 33 which fits within the groove 28 of the grommet body wall structure 26 to provide a seal and to hold the retainer 30 in place. Spring fingers 34, 36 are molded into opposed interior surfaces of the retainer 30 to snap-lock into the prepared opening (not shown) in the door panel as described above.

Figure 5:
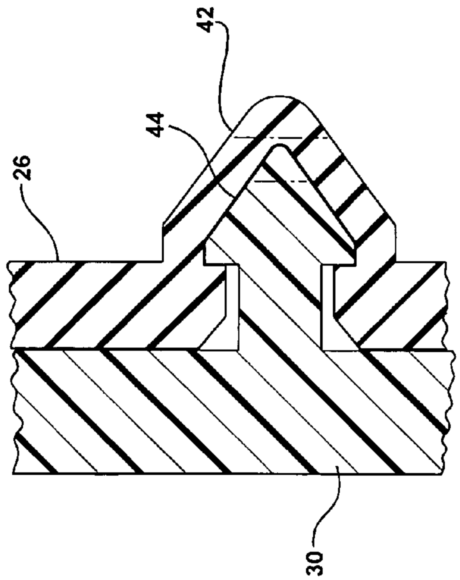
FIG. 5 is a detail of the FIG. 4 structure in enlarged form.
Figure 4:
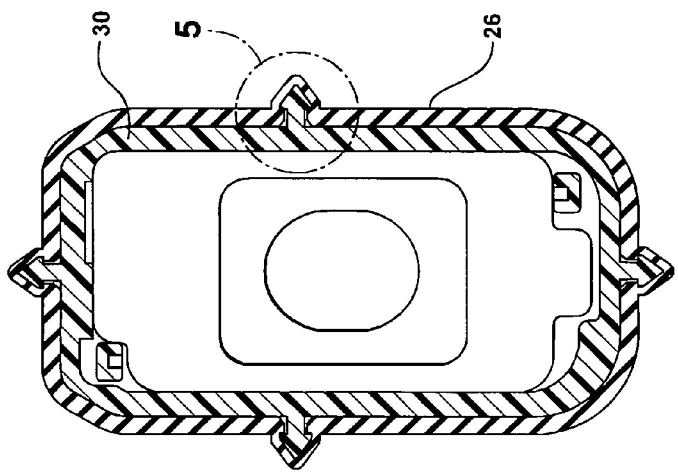
FIG. 4 is a sectional view showing the relationship between a properly installed grommet and retainer incorporating the present invention.

Raised arrowhead-shaped protrusions 44 are integrally molded into the edge flange 33 in opposed pairs so as to coincide in location to the receptacles 42 in the grommet wall structure 26 when properly inserted. The arrowhead-shaped protrusions 44 are located, sized and shaped so as to fit into and be received by the receptacles 42 only in one orientation of the retainer relative to the grommet. The arrowheads each have pedestals which extend the flattened surface 43 into a more pointed shape as shown in FIGS. 4–5 when fully inserted therein.

This provides two functions: first, the configuration and apparent size of the receptacle changes when the retainer 30 is properly installed, thus providing a visual confirmation or indication that the retainer has been installed and is in the proper orientation within the wall structure 26. Second, the fact that the arrowheads 44 are much harder than the EPDM rubber from which the grommet body is made provides a tactile confirmation or indication that the retainer 30 is properly in place within the grommet body. Because the receptacles 42 are essentially integral caps with the wall structure 26, there are no holes in the grommet body which might permit moisture to penetrate into the interior thereof and adversely affect any electrical wiring which is run through the grommet body from the fixed portion of the automobile body to the interior of the door 14.

A further benefit is that the arrowhead and receptacle design enables the retainer to be held more securely in the grommet body during shipping of an electrical wire harness incorporating the grommet assembly, and during installation at the car assembly line. Also, there is a reduction in the required width of the edge seal 27. The arrowhead and receptacle design allows an almost fifty percent narrower area for water sealing because the groove 28 in the wall structure 26 of the grommet body does not need to be as deep, and the edge flange 33 of the retainer does not need to be as wide, as compared to typical grommet body and retainer assemblies. This is important in environments where the area around the opening in the panel 16 for the grommet assembly is too small or cramped to accommodate large edge seal sizes.

Although incidental to this disclosure, the grommet body is further provided with a second end structure 38 and a second interior hard plastic retainer 40 to permit the grommet assembly 20 to be sealingly secured to the automotive door edge opening 12 as shown in FIG. 1. This end structure may be of a similar or different configuration than the structure 26.

The grommet body and retainers 30 and 40 are readily manufactured through well-known injection molding techniques and may be made of the specified materials or other available materials to be selected by the particular designer. It is recommended, however, to make the grommet body of a soft pliable material not only to provide the tactile and visual confirmation features of the invention described above but also to provide a good seal between the peripheral edge 27 of the grommet body and the flat surface of the panel to which it is attached.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A grommet assembly comprising:

a tubular grommet body to protect one or more lines extending longitudinally and internally therethrough and made of relatively soft pliable elastomeric material and having an open end bounded by a wall structure having an outside surface and terminating in a peripheral seal;

a retainer made of a relatively hard material and of such size and shape as to fit internally of and in connection with the wall structure of the grommet body;

said wall structure having at least one integral laterally extending receptacle formed therein which receptacle opens to the interior of the grommet body through said wall structure and presents a raised and pliable lateral detail on the outside surface of the wall structure of the grommet body; and said retainer having at least one peripheral and laterally extending protrusion formed thereon which, when said retainer resides internally of said wall structure, enters into and substantially fills said receptacle.

2. The grommet assembly defined in claim 1 wherein said protrusion, when filling said receptacle, enlarges the exterior thereof.

3. The grommet assembly defined in claim 1 wherein two receptacles and protrusions are arranged in oppositely laterally extending pairs.

4. The grommet assembly defined in claim 1 further including a groove formed internally of said wall structure and opening to the interior thereof, and a peripheral edge flange formed on said retainer for disposition within said groove.

5. The grommet assembly defined in claim 1 wherein said retainer comprises multiple locking fingers extending therefrom.

6. The grommet assembly defined in claim 1 wherein said protrusions are pointed.

7. The grommet assembly defined in claim 1 wherein said grommet body includes a second end structure and a second retainer.

8. The combination of a grommet and a retainer for said grommet comprising:

a tubular grommet body made of a relatively soft pliable material having a longitudinally extending tubular portion and an integral bell-shaped end portion having a peripheral wall structure symmetrically surrounding a longitudinal axis and having an inwardly opening circumferential groove formed therein to receive the peripheral flange of a retainer member therein;

a frame-shaped retainer member of relatively hard, non-pliable material and having a peripheral flange of such size and shape as to fit into the groove of the bell-shaped end portion of the grommet to retain said bell-shaped end portion on said retainer;

a plurality of inwardly opening raised pliable receptacles formed on said end portion and communicating inwardly with said groove; and a plurality of radially outwardly extending protrusions formed on said retainer member and contiguous with said flange to fit into said raised receptacles when said grommet is installed on said retainer with said peripheral flange in said groove to fill and change the tactile consistency of said receptacles as an indication of the presence of said protrusions in said receptacles in the installed condition.

9. The assembly defined in claim 8 wherein said retainer is made of a hard plastic and has longitudinally extending members to secure said retainer into an opening in an automotive body.

* * * * *